United States Patent [19]

Gurevitch et al.

[11] Patent Number: 5,082,902

[45] Date of Patent: Jan. 21, 1992

[54] METHOD FOR REDUCING CYCLE TIME AND IMPROVING MOLDED PART IMPACT ENERGY AND ESCR OF LINEAR HIGH DENSITY POLYETHYLENE USING A BLEND OF TWO LINEAR POLYETHYLENES OF DIFFERENT DENSITIES

[75] Inventors: Judithann Gurevitch, Clinton; Bruce S. Yarmoska, Somerville, both of N.J.; Harvey R. Gunter, Pearland, Tex.

[73] Assignee: Mobil Oil Corporation, Fairfax, Va.

[21] Appl. No.: 630,125

[22] Filed: Dec. 19, 1990

Related U.S. Application Data

[63] Continuation-in-part of Ser. No. 222,990, Jul. 22, 1988, abandoned, which is a continuation-in-part of Ser. No. 947,215, Dec. 29, 1986, abandoned.

[51] Int. Cl.$^5$ ............... C08L 23/06; C08L 23/08; C08L 23/20
[52] U.S. Cl. ............... 525/240; 264/331.17; 264/328.1; 264/328.17; 264/310
[58] Field of Search ............... 525/240; 264/331.17, 264/328.1, 310

[56] References Cited

U.S. PATENT DOCUMENTS

| | | | |
|---|---|---|---|
| 4,335,224 | 6/1982 | Matsuura et al. | 525/240 |
| 4,438,238 | 3/1984 | Fukushima et al. | 525/240 |
| 4,485,217 | 11/1984 | Gunter | 525/240 |
| 4,495,334 | 1/1985 | Matsuura | 525/240 |
| 4,539,374 | 9/1985 | Fenton | 525/240 |
| 4,547,551 | 10/1985 | Bailey | 525/240 |
| 4,550,143 | 11/1985 | Tanaka | 525/240 |
| 4,587,303 | 3/1986 | Turtle | 525/240 |
| 4,597,920 | 7/1986 | Golike | 264/22 |
| 4,786,688 | 11/1988 | Thiersault et al. | 525/240 |
| 4,842,922 | 6/1989 | Krupp et al. | 525/240 |

FOREIGN PATENT DOCUMENTS

| | | | |
|---|---|---|---|
| 58-059242 | 4/1983 | Japan | 525/240 |

OTHER PUBLICATIONS

VLDPE—"A New Class of PE"—Plastics & Rubber Inter., Apr. 1986, vol. 1, No. 2.
DuBois, Plastics, Reinhold Publishing Corp., pp. 75-81 (1967).

*Primary Examiner*—Carman J. Seccuro
*Attorney, Agent, or Firm*—Alexander J. McKillop; Charles J. Speciale; Laurence P. Hobbes

[57] ABSTRACT

The crystallization half-time and mold cycle time of high density (>0.935 g/cm$^3$) polyethylene are reduced and the impact energy is improved by blending two linear ethylene polymers differing in density by 0.015 to 0.150 g/cm$^3$, to achieve a density similar to a single high density polyethylene. Both polymer components and resulting blend have a melt flow ratio (MFR) of less than 35 which indicates a relatively narrow molecular weight distribution. Articles are formed which do not show the severe warpage experienced with conventional nucleating agents, and which exhibit impact properties superior to a similar single high density polyethylene copolymer.

2 Claims, No Drawings

METHOD FOR REDUCING CYCLE TIME AND IMPROVING MOLDED PART IMPACT ENERGY AND ESCR OF LINEAR HIGH DENSITY POLYETHYLENE USING A BLEND OF TWO LINEAR POLYETHYLENES OF DIFFERENT DENSITIES

RELATED APPLICATIONS

This application is a continuation-in-part of application Ser. No. 222,990, filed July 22, 1988, now abandoned which in turn is a continuation-in-part of application Ser. No. 947,215, filed Dec. 29, 1986, now abandoned, the contents of both being incorporated herein by reference.

BACKGROUND OF THE INVENTION

The length of time necessary to complete a cycle in various processes for polymer molding such as injection and rotational molding is largely governed by the crystallization time and crystallization temperature of the polymer. Nucleating agents such as sodium benzoate are used to reduce the crystallization time inpolypropylene. Some of the nucleating agents useful with polypropylene also work with linear polyethylenes such as linear low density and high density polyethylene but they often introduce severe and unacceptable warpage in the molded article. Therefore, there is a need for suitable methods for reducing crystallization time and, therefore, cycle time in the molding of linear polyethylene and copolymers without warpage of the molding.

SUMMARY OF THE INVENTION

The increased crystallization rate measured as crystallization half-times and molding cycle time in linear high density ethylene copolymer (HDPE) is achieved by substituting for said HDPE a blend of a higher density linear ethylene homopolymer or copolymer and a linear ethylene copolymer, e.g. linear low density polyethylene (LLDPE), having a somewhat lower density—i.e. a density that is lower by 0.015 to 0.150 units ($g/cm^3$), in such a ratio as to achieve a density similar to the substituted HDPE.

In one aspect of the invention, a polymer blend is provided having a melt index (MI) of 1 to 200 g/10 minutes, a melt flow ratio (MFR) of less than 35 and density greater than 0.935 $g/cm^3$, said blend comprising:

(a) 5 to 50 wt % of a first polymer, having a density of from 0.85 to 0.95 $g/cm^3$, an MI of 1 to 200 g/10 minutes and an MFR of less than 35, said first polymer comprising a linear copolymer of ethylene and a $C_3$ to $C_{10}$ alpha-olefin;

(b) 50 to 95 wt % of a second polymer blended with said first polymer, having a density which is 0.015 to 0.15 $g/cm^3$ greater than the density of said first polymer, an MI differing by no more than 50% from the MI of said first polymer, and an MFR of less than 35, said second polymer comprising a linear ethylene homopolymer or a copolymer of ethylene and a $C_3$ to $C_{10}$ alpha-olefin. The resulting composition can be molded, e.g. by rotational or injection molding.

The melt index (ASTM standard D1238, procedure 190/2.16, hereinafter MI) of the blend, the first polymer, and the second polymer is about 1 to 200 g/10 min in each case. Preferably, the melt index of at least one, more preferably of at least two, and most preferably of all three of the blend, the first polymer and the second polymer is about 5–50 g/10 min. for injection molding and 1.5–5 g/10 min. for rotational molding.

The molecular weight distribution of the blend, the first polymer and the second polymer, as expressed by the melt flow ratio (MFR) is less than 35, preferably ranging from 15 to 30. As is known to those skilled in the art, such MFR values are indicative of a relatively narrow molecular weight distribution of a polymer. Such MFR values are indicative of compositions especially suitable for injection and rotation molding applications since the polymers having such MFR values exhibit relatively low warpage and shrinkage on cooling of the molded products. MFR is defined herein as the ratio of the high load melt index (HLMI - $I_{21.6}$ or $I_{21}$) divided by the melt index ($I_{2.6}$ or $I_2$), i.e., $$MFR = \frac{I_{21.6}}{I_{2.16}}$$

where $I_{21.6}$ is determined according to the procedure of ASTM D-1238——condition E——measured at 190° C.——reported in grams per 10 minutes (g/10 min) and $I_{2.16}$ is determined according to the procedure of ASTM D-1238——condition F——measured at 0.1 times the weight used in the $I_{21.6}$ determination.

In another aspect of the invention the molding composition is a polymer blend, preferably a high density blend, comprising about 50 to 90 weight percent of a first polymer having a density greater than 0.94 $g/cm^3$, which comprises a linear polyethylene homopolymer or a linear copolymer of ethylene and an alpha-olefin containing 3 to 10, preferably 4 to 10, carbon atoms, having a density of 0.85 $g/cm^3$ to 0.950 $g/cm^3$, and about 10–50 weight percent of a second polymer having a density lower than 0.94 $g/cm^3$ and 0.005–0.150 $g/cm^3$ lower than the second polymer, the second polymer comprising a linear copolymer of ethylene and a $C_3$-$C_{10}$ alpha-olefin.

DETAILED DESCRIPTION OF THE INVENTION

The linear ethylene homopolymers and copolymers which are used in molding blends in accordance with the method of this invention are commercially available materials. They can be prepared under low pressure conditions using Ziegler-Natta catalysts or chromium oxide catalysts. Suitable linear ethylene copolymers and their production are described in U.S. Pat. No. 4,076,698, which is incorporated by reference.

The essential characteristic of the blends that can be molded in accordance with this invention is that they contain two linear ethylene polymer components which differ in density by at least 0.010 density units ($g/cm^3$) preferably by at least 0.030 density units ($g/cm^3$). Where the major component is an ethylene polymer having a density greater than 0.94, the lower density component can advantageously be present in amounts greater than 5 weight percent and up to 50 weight percent, preferably from about 15 to 40 weight percent. Particularly desirable blends exhibit crystallization half-times which are significantly lower, e.g. 90% or less, than those of a single ethylene polymer having about the same density and melt index. The blends also have a total impact energy, in a part which is injection or rotational molded from them, which is 10 to 50% higher than the corresponding single polymer, as well as an environmental stress crack resistance (ESCR) (ASTM D1693, condition B 10% Igepal CO-360) that is 3 to 10 times longer.

The blends preferably contain no other polymeric components besides the two necessary linear polyethylene components. Blending is accomplished by any suitable method including two reactors in series, with melt or dry blending being preferred.

Copolymers of ethylene with 1-butene, 1-hexene, and 1-octene are particularly advantageous, primarily because of cost and commercial availability, although the invention is broadly applicable to copolymers of ethylene and higher alpha olefins containing 3 to 10 carbon atoms. The relative amount of ethylene and alpha olefin in the copolymer is determined by the desired density.

While not wishing to be bound to any theory, we believe the higher density polyethylene nucleates the lower density polyethylene accelerating the rate of crystallization. Since the blend freezes faster and at a higher temperature, than a similar density single polymer, the molded article can be removed or ejected from the mold sooner, resulting in a shorter overall molding cycle time. Reduced cycle time and reduced warpage compared to that observed with conventional nucleating agents are considered significant commercial advantages. The modified crystal morphology of the molded blend provides improved physical properties (i.e. total impact energy, ESCR, etc.) compared to a molded similar density single polymer.

EXAMPLES 1-5

The following examples illustrate the applicability of the invention to high density polyethylene injection molding compositions.

The blends in Table I below were prepared using the indicated proportions of a linear ethylene homopolymer having a density of greater than 0.960 g/cm$^3$ and an MI of 50 g/10 min as the high density polymer (HD) and a linear ethylene-butene copolymer having a density of 0.928 g/cm$^3$ and a MI of 50 as the linear low density (LLDPE) polymer. The control resins (C-1 through C-5) were single high density linear ethylene-butene polymers having the indicated density and MI. The total impact energy of injection molded plaques and the crystallization half-times of the control resins and the corresponding blends having about the same density and MI were measured.

TABLE I

| Ex. | Parts HD/LLDPE | MI (g/10 min) | Density (g/cm$^3$) | MFR | Total Impact Energy @ 23° C. (in-lbs) | Crystallization Half-Times at 120° C. (sec.) |
| --- | --- | --- | --- | --- | --- | --- |
| C-1 | 100/0 | 51 | .953 | 24 | 51.8 | 107 |
| 1 | 64/36 | 54 | .954 | 25 | 62.0 | 81 |
| C-2 | 100/0 | 51 | .960 | 24 | 37.8 | 91 |
| 2 | 75/25 | 56 | .959 | 24 | 53.6 | 79 |
| C-3 | 100/0 | 56 | .947 | 23 | 50.4 | 634 |
| 3 | 53/47 | 45 | .946 | 24 | 52.2 | 190 |
| C-4 | 100/0 | 54 | .952 | 23 | 38.0 | 431 |
| 4 | 73/27 | 50 | .953 | 24 | 58.8 | 139 |
| C-5 | 100/0 | 47 | .954 | 25 | 43.8 | 154 |
| 5 | 83/17 | 49 | .956 | 25 | 53.0 | 113 |

EXAMPLES 6-12

Examples 6-12 illustrate the applicability of the invention to high density polyethylene rotational molding compositions.

The blends in Table II (Examples 7-10) were prepared using the indicated proportions of samples 6 and 11. Comparison of Examples 10 and 12 shows identical densities but higher ESR, Total Impact Energy and shorter crystallization half time for the blend (Example 10).

TABLE II

| EXAMPLE/ SAMPLE NUMBER | 6 | 7 | 8 | 9 | 10 | 11 | 12 |
| --- | --- | --- | --- | --- | --- | --- | --- |
| SAMPLE 6, % | 100 | 80 | 70 | 60 | 50 | 0 | 0 |
| SAMPLE 11, % | 0 | 20 | 30 | 40 | 50 | 100 | 0 |
| SAMPLE 12, % | 0 | 0 | 0 | 0 | 0 | 0 | 100 |
| DENSITY, g/cm$^3$ | 0.963 | 0.956 | 0.950 | 0.945 | 0.940 | 0.919 | 0.940 |
| MELT INDEX (190/2.16), g/10 min | 3.3 | 3.3 | 3.4 | 3.3 | 3.3 | 3.3 | 3.2 |
| MELT FLOW RATIO | 26 | 26 | 26 | 27 | 27 | 28 | 24 |
| CRYSTALLIZATION HALF TIME @ 122 C, seconds | 113 | 140 | 189 | 219 | 292 | 6000 | 725 |
| ENVIRONMENTAL STRESS CRACK RESISTANCE, F50, hrs. ASTM D1693, COND. B, 10% IGEPAL CO630 SOLUTION | 0 | 34 | 60 | 220 | >1000 | >1000 | 67 |
| TOTAL IMPACT ENERGY @ 23C, IN-LBS | 86 | 131 | 165 | 176 | 195 | 135 | 149 |

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

It is claimed:

1. A method for forming articles comprising:

(1) preparing a polymer blend having a melt index (MI) of 1 to 200 g/10 minutes, melt flow ratio (MFR) of less than 35 and density greater than 0.935 g/cm$^3$ comprising:
 (a) 5 to 50 wt % of a first polymer, having a density of from 0.85 to 0.95 g/cm$^3$, an MI of 1 to 200 g/10 minutes and an MRF of less than 35, said first polymer comprising a linear copolymer of ethylene and a C$_3$ and C$_{10}$ alpha-olefin;
 (b) 50 to 95 wt % of a second polymer blended with said first polymer, having a density which is 0.015 to 0.15 g/cm$^3$ greater than the density of said first polymer, an MI differing by no more than 50% from the MI of said first polymer, and an MFR of less than 35, said second polymer comprising a linear ethylene homopolymer or a copolymer of ethylene and a C$_3$ to C$_{10}$ alpha-olefin,
(2) subjecting said polymer blend to injection or rotational molding.

2. The method of claim 1 wherein said first polymer comprises from 10% to 50% of said polymer blend and said second polymer comprises from 50% to 90% of said polymer blend.

* * * * *

UNITED STATES PATENT AND TRADEMARK OFFICE
CERTIFICATE OF CORRECTION

PATENT NO. : 5,082,902

DATED : January 21, 1992

INVENTOR(S) : Judithann Gurevitch et al.

It is certified that error appears in the above-identified patent and that said Letters Patent is hereby corrected as shown below:

column 5, line 9, the second occurrence of "and" should read --to--.

Signed and Sealed this

Twenty-second Day of June, 1993

Attest:

MICHAEL K. KIRK

Attesting Officer

Acting Commissioner of Patents and Trademarks